US006421668B1

(12) United States Patent
Yakhini et al.

(10) Patent No.: US 6,421,668 B1
(45) Date of Patent: Jul. 16, 2002

(54) METHOD AND SYSTEM FOR PARTITIONING DATA INTO SUBSETS OF RELATED DATA

(75) Inventors: Zohar H Yakhini, Ya'acov (IL); Amir Ben-Dor, Redmond, WA (US); Ron Shamir, Rehovot (IL)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/369,210

(22) Filed: Aug. 5, 1999

(51) Int. Cl.$^7$ .............................. G06F 17/30; G06F 7/00
(52) U.S. Cl. ......................... 707/6; 707/101; 707/104.1
(58) Field of Search ........................... 706/13; 707/6–7, 707/101, 104.1; 702/179–181, 127–128, 19–21

(56) References Cited

U.S. PATENT DOCUMENTS

| | | | | | |
|---|---|---|---|---|---|
| 4,937,747 | A | * | 6/1990 | Koller ........................ | 702/12 |
| 5,263,120 | A | * | 11/1993 | Bickel ........................ | 706/62 |
| 5,857,169 | A | * | 1/1999 | Seide ........................ | 704/256 |
| 5,933,818 | A | * | 8/1999 | Kasravi et al. ............... | 706/12 |
| 5,983,224 | A | * | 11/1999 | Singh et al. .................. | 707/6 |
| 6,012,058 | A | * | 1/2000 | Fayyad et al. ................ | 707/6 |
| 6,049,797 | A | * | 4/2000 | Guha et al. .................. | 707/6 |
| 6,122,628 | A | * | 9/2000 | Castelli et al. ............... | 707/5 |
| 6,134,541 | A | * | 10/2000 | Castelli et al. ............... | 707/2 |
| 6,182,091 | B1 | * | 1/2001 | Pitkow et al. ............... | 707/501 |

OTHER PUBLICATIONS

Ben–Dor, A. and Yakhini, Z. "Clustering Gene Expression Patterns", Proceedings of the Third Annual International Conference on Computational Molecular Biology, Apr. 11–14, 1999, pp. 33–42.*

A. Ben–Dor and Z. Yakhini, "Clustering Gene Expression Patterns", Proceedings of the Third Annual International Conference on Computational Molecular Biology, Apr. 11–14, 1999, pp. 33–42.*

E. Hartuv et al., "An Algorithm for Clustering cDNAs for Gene Expression Analysis", Proceedings of the Third Annual International Conference on Computational Molecular Biology, Apr. 11–14, 1999, pp. 188–197.*

I. Hofman and R. Jarvis, "Robust and Efficient Cluster Analysis Using a Shared Near Neighbours Approach", Proceedings of the 14th International Conference on Pattern Recognition, Aug. 16–20, 1998, vol. 1, pp. 243–247.*

R. Drmanac G. Lennon S. Drmanac I. Labat R. Crkvenjakov and H. Lehrach. Partial sequencing by oligohybridization: Concept and applications in genome analysis. In Proceedings of the first international conference on electrophoresis supercomputing and the human genome Edited by C. Cantor and H. Lim, pp. 60–75, Singapore, 1991, World Scientific.

A.P. Blanchard and L. Hood, Sequence to array:probing the genome's secrets. Nature Biotechnology, 14:1649–1996.

Large–scale temporal gene expression mapping of central nervouse system development Wen XL, Fuhrman S, Michaels GS, Carr DB, Smith S, Barker JL, Somogyi R. Proceedings of The National Academy of Sciences of The United States of America 95:(1) 334–339 Jan 6 1998.

(List continued on next page.)

*Primary Examiner*—Jean R. Homere
*Assistant Examiner*—Luke S. Wassum

(57) ABSTRACT

A method and system for applying arbitrary similarity metrics to data entities in order to partition the entities into subsets of related entities. The method and system iteratively construct successive subsets, during construction of each subset adding candidate entities, not yet assigned to a subset, with high affinities toward the subset and removing entities previously assigned to the subset for which the affinities toward the subset have decreased. The method and system efficiently partition data with a high probability of finding an optimal or near-optimal partitioning.

27 Claims, 4 Drawing Sheets

OTHER PUBLICATIONS

J. DeRisi, V. Iyer and P. Brown. Exploring the metabolic genetic control of gene expression on a genomic scale, science, 278:680–686, 1997.

H. Chernoff. A measure for the asymptotic efficiency for tests of a hypothesis based on the sum of observations. Ann. of Math. Stat., 23:493–509, 1952.

D.J. Lockhart, H. Dong, M.C. Byrne, M.T. Follettie, M.V. Gallo, M.S. Chee, M. Mittmann, C. Wang, M. Kobayashi, H. Horton, and E.L. Brown. Dna expression monitoring by hybridization to high density oligonucleotide arrays. Nature Biotechnology, 14:1675–1680, Dec. 1996.

Expected Complexity of Graph Partitioning Problems. Kucera L. Discrete Applied Mathematics 57: (2–3) 193–212 Feb 24 1995.

Hybridization of DNA With Oligonucleotides Immobililzed in Gel–A Convenient Method For Detecting Single Base Substitutions. Khrapko KR, Khorlin AA, Ivanov IB, Chernov BK, Lysov, YP, Vasilenko SK, Florentev VL, Mirzabekov AD, Molecular Biology 25: (3) 581–591, Part 2 May–Jun. 1991.

Improved Chips For Sequencing By Hybridization. Pevzner PA, Lysov YP, Khrapko KR, Belyavsky AV, Florentiev VL, Mirzabekov AD, Journal of Biomolecular Structure & Dynamics 9: (2) 399–410 Oct. 1991.

Developmental Kinetics of Gad Family Messenger–RNAS Parallel Neurogenesis in The Rat Spinal–Cord, Somogy R, Wen XL, Ma W, Barker JL. Journal of Neuroscience 15 (4) 2575–2591 Apr. 1995.

Characterization of the yeast trascriptome. Velculescu VE, Zhang L, Zhou W, Vogelstein J, Basrai MA, Bassett DE, Hieter P, Vogelstein B, Kinzler KW. Cell 88: (2) 243–251 Jan. 24 1997.

Finding a large hidden clique in a random graph. Alon N, Krivelevich M, Sudakov B, Random Structures & Algorithms 13: (3–4) 457–466 Oct–Dec 1998.

G.S. Lennon and H. Lehrach. Hybridization analysis of arrayed cdna libraries. Trends Genet, 7:60–75, 1991.

J. Khan, R. Simon, M. Bittner, Y. Chen, S.B. Leighton, T. Phodia, P.D. Smith, Y. Jiang, G.C. Gooden, J.M. Trent, and P.S. Meltzer. Gene expression profiling a alveolar rhabdomyosarcoma with cdna microarrays. manuscript, accepted to Cancer Research, 1998.

C.Y. Lin, K.H. Hahnenberger, M.T. Cronin, D. Lee, N.M. Sampas, and R. Kanemoto. A method for genotyping cyp2d6 and cyp2c19 using genechip prob array hybridization. In ISSX Meeting, 1996.

Y. Lysov, A. Chernyi, A. Balaev, F. Gnuchev, K. Beattie, and = A. Mirzabekov. Sequencing Efficancy of Contiguous Stacking Hybridization of Oligonucleotide Matrices of Variable Tuple Length, Translated From Molkolyarvaya Biologiya, vol. 28, No. 4, pp. 832–839, Jul.–Aug. 1994.

Y. Lysov, A. Chemyi, A. Balaev, F. Gnuchev, K. Beattie, and A. Mirzabekov DNA Sequencing by Contiguous Stacking Hybridization on Modified Oligonucleotide Matrices Translated from Molekuhyarnaya Biologiya, vol. 29, No. 1, pp. 104–113, Jan.–Feb. 1995.

* cited by examiner

```
1 •Input: an n-by-n similarity matrix Σ, and a cutoff parameter t.
2 •Initializations:
3    C ← ∅                /* The collection of closed clusters*/
4    C_Open ← ∅           /* The constructed cluster */
5    U ← {1,...,n}        /* Elements not yet assigned to any cluster */
6    a() ← 0              /* Reset the affinity (total similarity between v and elements in C_Open) */
7
8 • while (U ∪ C_Open ≠ ∅) do
9      Let u be an element with maximal affinity in U.
10     if (a(u) ≥ t|C_Open|)              /* u is of high affinity */
11           C_Open ← C_Open ∪ {u}         /* Insert u into C_Open */
12           U ← U \{u}                   /* Remove u from U */
13           For all x in U ∪ C_Open do
14                 a(x) = a(x) + Σ(x,u)   /* Update the affinity */
15           end
16     else                                /* No high affinity elements outside C_Open */
17           Let v be a vertex with minimal affinity in C_Open */
18           if (a(v) < t|C_Open|)         /* v is of low affinity */
19                 C_Open ← C_Open \{v}    /* Remove v from C_Open */
20                 U ← U ∪ {v}             /* Insert v into U */
21                 For all x in U ∪ C_Open do
22                       a(x) = a(x) - Σ(x,v)    /* Update the affinity */
23                 end
24           else /* C_Open is clean */
25                 C ← C ∪ C_Open          /* Close the cluster */
26                 C_Open ← ∅              /* Start a new cluster */
27                 a (.) ← 0               /* Reset affinity */
28           end
29     end
30 end
31
32 • Done, return the collection of clusters, C.
```

*Fig. 5*

METHOD AND SYSTEM FOR PARTITIONING DATA INTO SUBSETS OF RELATED DATA

TECHNICAL FIELD

The present invention relates to methods and systems for partitioning, or clustering, data into subsets of related data and, in particular, to a method and system for projecting a graph onto a clique graph that has applications in clustering gene expression patterns, methylation profiles, hybridization signals, and other types of experimental and observational data in scientific and technical fields and in economics.

BACKGROUND OF THE INVENTION

A frequently encountered problem in processing data generated by scientific experimentation and scientific and economic observation is that of partitioning data into related data subsets. For example, stock market analysts attempt to identify groups of stocks that rise and fall in price together in response to various cycles and trends. The observed data are the prices of each stock over a period of time, and the partitioning, or clustering, problem is one of grouping the stocks into related subsets of stocks that exhibit similar price behaviors. As another example, molecular biologists use large molecular arrays to monitor the expressions of genes in organisms over time and in response to various biological perturbations. One object in such studies is to identify groups, or clusters, of genes that all have similar expression patterns. Often, indications of the function of a gene product can be gleaned from determining that the expression of the corresponding gene is similar to the expression of a known gene. For example, an unknown gene that is always expressed immediately following expression of the p53 gene may indicate that the unknown gene product is somehow related to apoptosis.

The general class of problems exemplified in the previous paragraph is referred to as cluster analysis. The goal of cluster analysis is to partition entities into groups, called clusters, so that clusters are homogeneous and well-separated. There is an extensive literature on cluster analysis going back over two decades, including, the following three titles: (1) R. O. Duda and P. E. Hart, *Pattern classification and scene analysis*, Wiley-interscience, NY, 1973; (2) B. Everitt, *Cluster Analysis*, Edward Arnold, London, Third Edition, 1993; and (3) B. Mirkin, *Mathematical classification and clustering*, Kluwer Academic Publishers, 1996. There are many different approaches to defining desirable solutions to cluster analysis and for interpreting those solutions, and there are many different types of clustering that may be identified by clustering analysis. Most formulations of the problem yield NP hard problems. Therefore, many of the approaches emphasize heuristics and approximation. Many of the approaches to cluster analysis, particularly in the field of clustering gene expression patterns, utilize hierarchical methods in which phylogenetic trees are constructed using Euclidean distance metrics for evaluating the relatedness of the different expression patterns of various genes. Euclidean distance metrics are but a small subset of relatedness metrics that might be employed in clustering data, but clustering methods often depend on using a particular type of metric. In many of these approaches, prior assumptions concerning the nature of underlying clustering within the data are required in order to constrain a search for clusters. Many of these methods may often converge on local minima, rather than identifying the most optimal clustering patterns within the data according to some pre-defined measure of optimality.

Scientists, economists, and data analysts have therefore recognized the need for a method and system that can be applied to data in order to partition the data into related subsets, where the relatedness of the data can be specified by arbitrary methods. In addition, the need for an efficient method for identifying clustering within data that does not rely on prior assumptions about the data, including such things as the maximum number of clusters, a preferred cluster size, and other such constraints, has been recognized. Moreover, scientists, economists, and data analysts have recognized the need for an algorithm that has a high probability of determining an optimal or near-optimal partitioning of data into related data sets, rather than too quickly converging on less-than-optimal partitionings.

SUMMARY OF THE INVENTION

The present invention provides a method and system for partitioning data into related data subsets. In one embodiment of the present invention, the method and system takes, as inputs, a data set, a similarity matrix that specifies the relatedness of the data points, or entities within the data set, and a cutoff value that divides relatedness values into low affinity relatedness values and high affinity relatedness values. The method and system iteratively constructs successive clusters of related data subsets until all data points, or entities, are assigned to a cluster. Initially, all the data points, or entities, are unassigned. Unassigned data points are candidates for assignment to a cluster that is being constructed in a given iterative step. During each iterative step, data points assigned to the currently constructed cluster may be removed from the cluster and returned to the pool of candidates. During each iterative step, the method and system may alternate between choosing high affinity candidates and assigning them to the currently constructed cluster, and removing data points from the currently constructed cluster and returning the removed data points to the candidate pool.

Because the relatedness criteria are input as a similarity matrix, the method and system representing this embodiment of the present invention makes no assumptions or reliance on the metrics employed to generate the relatedness criteria. This embodiment of the present invention does not require specification of any additional constraints, such as preferred cluster sizes or a preferred number of clusters, in order to efficiently and effectively partition the data. Finally, because data points, or entities, may be alternatively added and removed during the construction of a given cluster, the method and system is far less prone to converge on suboptimal partitionings than currently available systems.

BRIEF DESCRIPTION OF THE DRAWINGS

FIG. 5 shows an abstract, pseudo-code implementation of an expression cluster analysis system based on the present invention.

DETAILED DESCRIPTION OF THE INVENTION

One embodiment of the present invention provides a method and system for partitioning a set of data points, or entities, into subsets of related data points, or entities. This embodiment of the present invention finds application in a wide variety of different fields, including biology, medicine, psychology, economics, and other natural and observational sciences. This embodiment of the present invention takes, as input, an initial set of data points, or entities, a similarity matrix that contains a similarity value, or relatedness value, for all pairwise combinations of entities, and a cutoff value that partitions the similarity values into low affinity similarity values and high affinity similarity values. The method and system iteratively constructs successive subsets, or clusters, of related entities by alternately adding unassigned, high-affinity entities to a cluster and removing low-affinity entities, previously assigned to the cluster, from the cluster and returning the removed entities to the pool of unassigned entities. The similarity matrix input to the present method and system can be constructed based on any number of different types of metrics, allowing the method and system to employ any number of different types of relatedness criteria in order to partition entities into related subsets. The method and system require no additional input in the form of prior knowledge or assumption about inherent clustering within the data set, and are instead sufficiently implicitly constrained to arrive, with high probability, at an optimal or near-optimal partitioning. Finally, because each cluster construction may involve alternate addition and removal of entities, the present invention avoids too rapidly converging on sub-optimal partitioning.

The present invention will be described, below, in three subsections. The first subsection details a graph-theoretical approach with reference to an example graph and an abstract graph-theoretical pseudo-code implementation. In the second subsection, a practical but hypothetical gene expression example is presented, along with an abstract pseudo-code implementation. In the third subsection, a detailed C++-like pseudo-code implementation is provided, along with results of a cluster analysis conducted using the C++-implementation and the data of the practical gene expression example presented in the second subsection.

Graph-theoretical Approach

A graph-theoretical approach can be used to describe the method and system of a preferred embodiment of the present invention. This graph-theoretical approach will be described with reference to FIGS. 1–4. A graph-theoretical pseudo-code implementation of the method will then follow.

Figure 1:
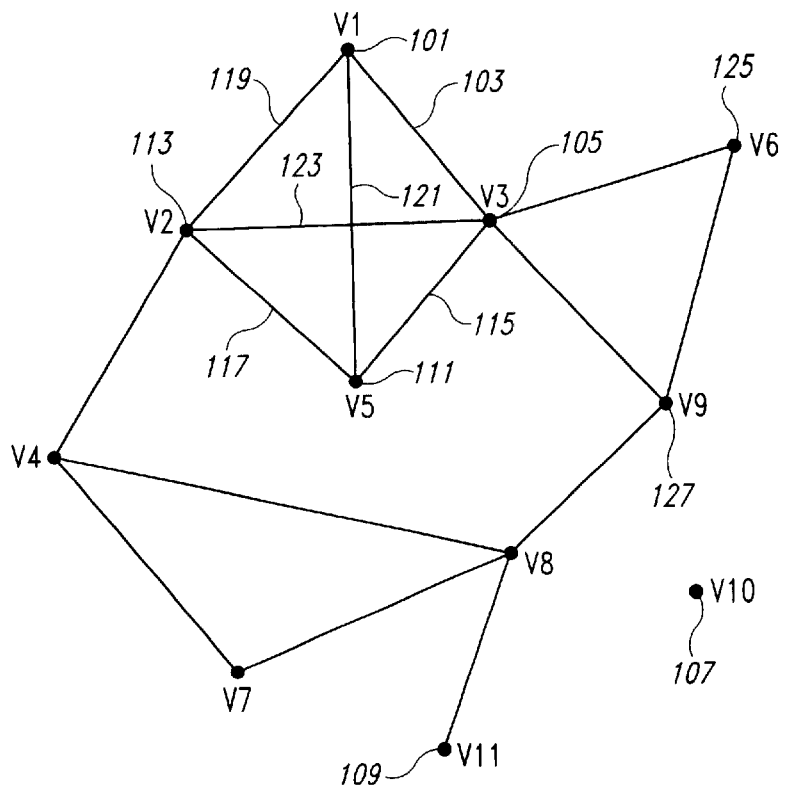
FIG. 1 illustrates the graph theoretical concept of a clique.

FIG. 1 illustrates the graph theoretical concept of a clique. In FIG. 1, vertices, also called nodes or points, such as vertex "V1" 101, are connected to other vertices by edges, or line segments, such as edge 103 that interconnects vertex "V1" 101 and vertex "V3" 105. A vertex may share no edges with other vertices, such as vertex "V10" 107, may share a single edge with another vertex, such as vertex "V11" 109, or may share multiple edges with other vertices, such as vertex "V3" 105. In a complete graph, each node is interconnected with all other nodes in the graph. The graph in FIG. 1 is not a complete graph since not even one of the eleven vertices in the graph is interconnected with all of the vertices in the graph. However, an incomplete graph, such as the graph shown in FIG. 1, may contain complete subgraphs, called cliques, in which each vertex is interconnected with all other vertices within the subgraph. For example, vertices "V1" 101, "V3" 105, "V5" 111, and "V2" 113 are completely interconnected via edges 103, 115, 117, 119, 121, and 123. Similarly, vertices "V3" 105, "V6" 125, and "V9" 127 together form a clique. A single disjoint vertex such as vertex "V10" 107 may be considered to comprise a clique having one vertex.

Figure 2:
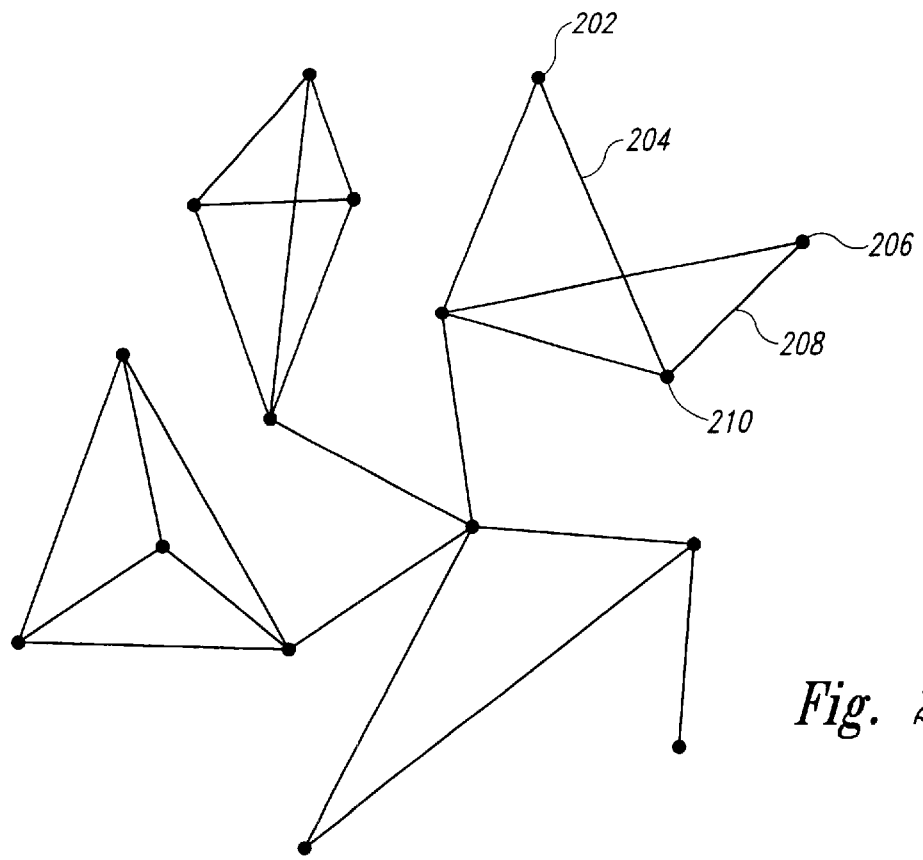
FIG. 2 shows a second, incomplete graph.
Figure 3:
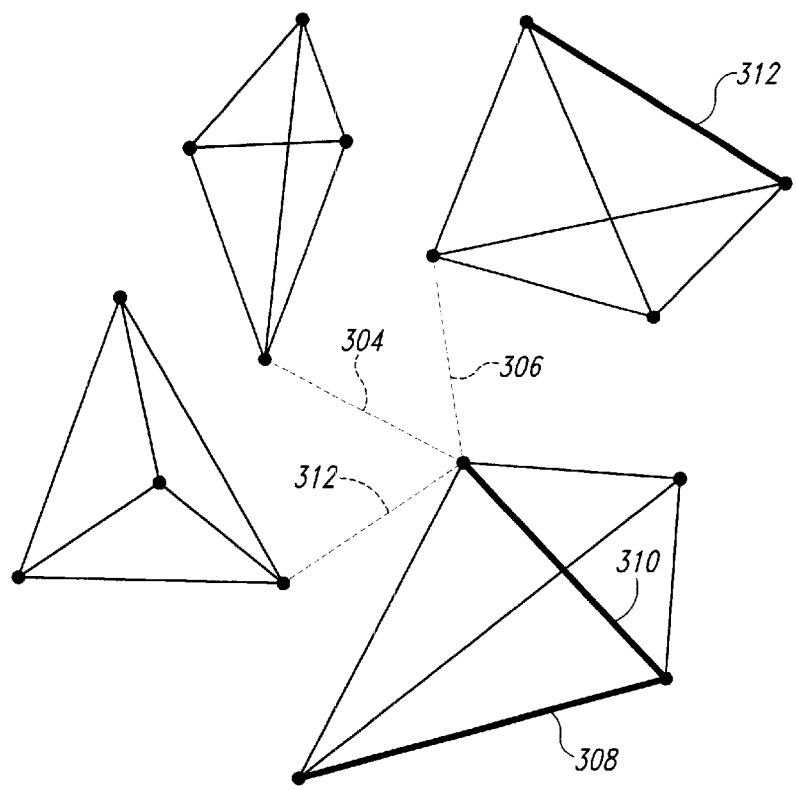
FIG. 3 illustrates the removal and addition of edges to the graph shown in FIG. 2.
Figure 4:
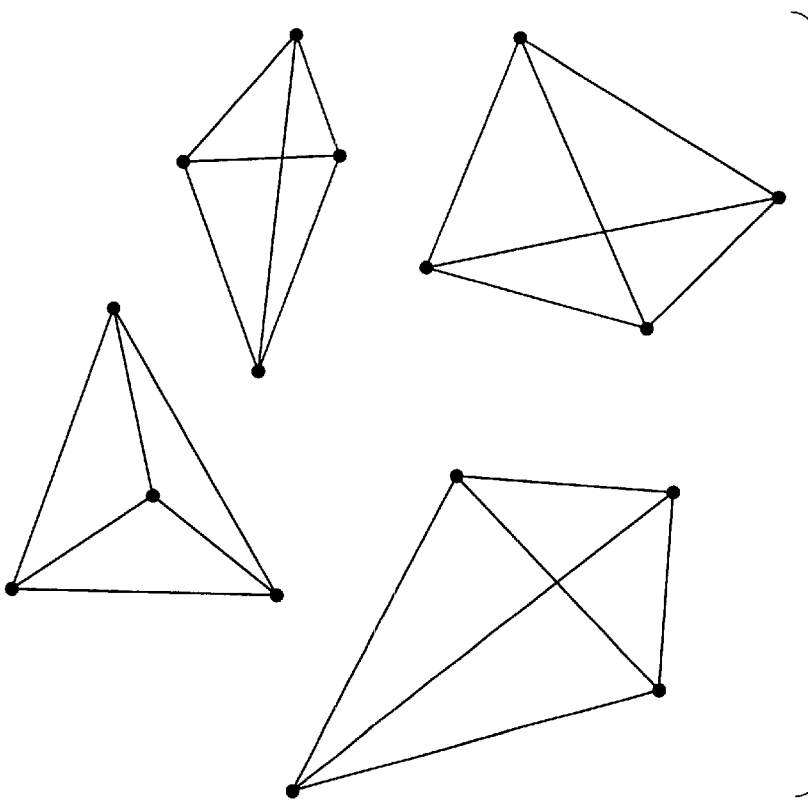
FIG. 4 illustrates the resulting disjoint set of cliques resulting from the edge additions and deletions illustrated in FIG. 3.

FIG. 2 shows a second, incomplete graph. This graph, along with variations of this graph shown in FIGS. 3 and 4, is used to provide a graph-theoretical illustration of the technique employed in one embodiment of the present invention. The vertices in the graph shown in FIG. 2, such as vertex 202, represent data points, or entities, of a data set. The edges interconnecting the vertices, such as edge 204, represent relatedness, or similarity relationships between the vertices. Thus, in this simplified example, two vertices are related when they are interconnected by a single edge. Two points that are not directly interconnected by an edge, but that are interconnected by two edges and an intervening vertex, such as vertices 202 and 206, interconnected via edges 204 and 208 and intervening vertex 210, may be related, but less strongly related than two vertices directly interconnected by an edge. One view of cluster analysis is that cluster analysis attempts to transform a graph, such as the graph shown in FIG. 2, into a disjoint, or non-interconnected, set of cliques. The rationale for this transformation is that the entire initial set of data points, or entities, may be naturally partitioned via similarity or relatedness criteria into a number of distinct, interrelated subsets of data points, or entities. For example, in analyzing the expression patterns of genes, it is natural to assume that the gene products of certain subsets of the genes are involved in various biological subsystems or subcomponents having different expression patterns. These patterns may be exhibited in a time-dependant fashion with respect to various biological stimuli or with respect to natural biological cycles, such as cell division. The initial data is not cleanly partitioned into disjoint cliques because of various experimental errors, recording errors, or other such discrepancies that commonly degrade naturally observed or experimentally determined data sets. The essence of the cluster analysis performed by the described embodiment of the present invention is to transform a graph, such as the graph shown in FIG. 2, into a disjoint set of cliques with the fewest possible additions and removals of edges.

FIG. 3 illustrates the removal and addition of edges to the graph shown in FIG. 2. Edges removed from the graph shown in FIG. 2 are indicated in FIG. 3 by dashed lines 302, 304, and 306. Edges added to the graph in FIG. 2 are shown in FIG. 3 as bold lines 308, 310, and 312. FIG. 4 illustrates the resulting disjoint set of cliques resulting from the edge additions and deletions illustrated in FIG. 3. By removing three edges contained in the graph shown in FIG. 2, and by adding three edges to the graph shown in FIG. 2, the interconnected nodes of FIG. 2 are partitioned, in FIG. 4, into four subsets of related nodes. In this simple example, the deleted and added edges are assumed to represent various experimental errors and data recording errors that obscured, in the initial data set, the clustering apparent in FIG. 4.

The following pseudo-code implementation illustrates an embodiment of the present invention directed to the cluster analysis technique illustrated in FIGS. 1–4.

```
1   function Cluster = FindNextCluster(graph G = (V,E))
2
3   Initializations:
4     U = V /* Vertices not yet assigned to a cluster */
5     C_Open = Ø /* The currently open cluster */
6
7   while (U ≠ Ø) do
8     if (C_Open = Ø)
```

-continued

```
9         For all v ∈ U set d2C(v) = deg(v)
10        v₀ = arg max ᵥ∈U d2C(v)
11        C_Open ← v₀
12        U = U \ v₀
13     else
14        For all v ∈ U set d2C(v) = #(neighbors of v in C_Open) / #C_Open 15        v₀ = arg max ᵥ∈U d2C(v)
16        if (d2C(v₀) ≧ 1/2#C_Open)
17           C_Open ← v₀
18           U = U \ v₀
19        else
20           if (min_{v∈C_Open} d2C(v) ≧ 1/2)
21              Cluster = C_Open
22              break
23           else
24.             U = U ∪ {v∈C_Open: d2C(v) <½}
25              C_Open = C_Open \ {v∈C_Open : d2C(v) <½}
26           end
27        end
28     end
29  end
30
31  ●Main module
32  Initializations
33  C = Ø /* The collection of closed (constructed) clusters */
34  U = V /* Vertices not yet assigned to a cluster */
35  G_C = G /* The graph being currently worked on */
36
37  while (U ≠ Ø) do
38        C = FindNextCluster (G_C)
39        C ← C
40        U = U\C
41        G_C = the induced graph on U
42  end
43
44  ● Done, C holds the clustering partition of V.
```

The main module begins on line 31. The main module employs the following set variables: (1) "C," the collection of constructed clusters, initially the empty set; (2) "U," the set of unassigned vertices, initially all the vertices in a graph; (3) "$G_C$," the current state of the graph, having an initial value equivalent to some graph, such as the graph shown in FIG. 2; and (4) "C," a set variable that contains a single cluster, or set of interrelated vertices. On line 33, the set variable "C" is initialized to the empty set. On line 34, the set of unassigned vertices "U" is set to all vertices in the graph "V." On line 35, the current state of the graph "$G_C$" is set to some initially supplied graph, such as the graph shown in FIG. 2.

The main module consists of a while-loop comprising lines 37–42. This while-loop continues to iterate while the set of unassigned vertices "U" is non-empty. On line 38, the main module calls the function "FindNextCluster," supplying FindNextCluster with the current state of the graph "$G_C$" as an argument, to assign the set variable "C" to the next cluster constructed from the graph "$G_C$" by FindNextCluster. On line 39, this next constructed cluster is added to the collection of clusters "C" that represents the result of cluster analysis. On line 40, those vertices in the constructed cluster "C" are removed from the set of unassigned vertices "U." Finally, on line 41, the current state of the graph "$G_C$" is altered to indicate the removal of the constructed cluster "C" from the graph. When the while-loop comprising lines 37–42 finishes, the set variable "C" contains a collection of constructed clusters that represents a clique graph or, in other words, a partitioning of the vertices of the original graph into a disjoint collection of subsets of interrelated vertices.

The function "FindNextCluster" comprises lines 1–29 in the above pseudo-code implementation. FindNextCluster takes a graph "G" as an argument, where the graph consists of a number of vertices "V" and edges "E." The set variable "U" comprises those vertices not yet assigned to a cluster, and the set variable "$C_{Open}$" includes those vertices assigned to the cluster currently being constructed by the function "FindNextCluster." The function "FindNextCluster" consists of a while-loop comprising lines 7–28. This while-loop continues to iterate until either all unassigned vertices have been assigned to the currently constructed cluster "$C_{Open}$" or until no additional vertices can be assigned to $C_{Open}$ and no vertices can be removed from $C_{Open}$. If the currently constructed cluster contains no vertices, as detected by FindNextCluster on line 8, then an initial member for the currently constructed cluster is selected on lines 9 and 10. The initial member selected is the unassigned vertex having a maximal number of edges. The function "d2C," called on lines 9 and 10, returns a relatedness, or affinity, value of a vertex for the aggregate vertices currently contained in the constructed cluster "$C_{Open}$." On line 9, this relatedness is initially set to the degree of each vertex, where the degree of a vertex is the number of edges that emanate from the vertex. Once an initial member for the currently constructed cluster is selected on lines 9 and 10, that selected vertex is inserted in the cluster "$C_{Open}$" on line 11, and the selected vertex is removed from the set of unassigned vertices "U."

If, on the other hand, the currently constructed cluster already has one or more vertices at the beginning of a current iteration of the while-loop comprising lines 7–28, then the statements starting on line 14, above, are executed. First, on line 14, the affinity for each unassigned vertex is set to be the ratio of the number of current members of cluster "$C_{Open}$" which share an edge with the vertex divided by the total number of members in cluster "$C_{Open}$." Next, on line 15, the unassigned vertex with the maximal affinity for the currently constructed cluster is selected. If the affinity of the selected vertex is greater than or equal to a cutoff value, in this case ½, then the selected vertex is added to the currently constructed cluster on line 17 and removed from the set of unassigned vertices on line 18. Thus, providing that additional high-affinity unassigned vertices remain in the set of unassigned vertices "U," each successive iteration of the while-loop comprising lines 7–28 assigns one more high-affinity vertex to the currently constructed cluster "$C_{Open}$." However, when no high-affinity unassigned vertices can be found, then FindNextCluster attempts to remove a low-affinity vertex from the cluster, on lines 20–25. A low-affinity vertex is one for which the relatedness measure returned by the function "d2C" is less than a cutoff value, in this case ½. If no such low-affinity vertices are contained in a currently constructed cluster "$C_{Open}$," then the cluster is complete, as detected on line 20, and FindNextCluster returns the complete cluster on line 21 prior to breaking out of the while-loop and completing execution on line 22. Otherwise, on lines 24 and 25, the identified low-affinity vertex is removed from the currently constructed cluster and returned to the set of unassigned variables "U." Note that the affinities of both unassigned vertices and vertices contained in the currently constructed cluster change with the addition of a vertex to, or removal of a vertex from, the cluster. Thus, an early assigned vertex that originally had high affinity for the cluster may end up having a low affinity for the cluster due to the intervening addition of one or more later assigned vertices for which the early assigned vertex has relatively low affinity.

A Practical Gene Expression Clustering Example

In this subsection, a hypothetical gene expression pattern clustering example will be with reference to Tables 1–10, included below, and with reference to a relatively abstract pseudo-code implementation and a C++-like pseudo-code implementation that are included below following Tables 1–10. This example illustrates a practical application of one embodiment of the present invention and provides implementation details of a preferred embodiment of the present invention as applied to molecular biology clustering problems, including gene expression cluster analysis.

Tables 1–6, below, represent the raw data resulting from a gene expression experiment:

TABLE 1

Time = 1

| | | | | |
|---|---|---|---|---|
| 0 | 1 | 0 | 0 | 2 |
| 0 | 0 | 0 | 0 | 1 |
| 0 | 0 | 2 | 0 | 0 |
| 0 | 0 | 0 | 2 | 0 |
| 0 | 0 | 0 | 0 | 2 |

TABLE 2

Time = 2

| | | | | |
|---|---|---|---|---|
| 0 | 1 | 0 | 0 | 1 |
| 0 | 0 | 0 | 0 | 0 |
| 1 | 0 | 2 | 0 | 1 |
| 0 | 1 | 0 | 2 | 0 |
| 0 | 1 | 0 | 0 | 2 |

TABLE 3

Time = 3

| | | | | |
|---|---|---|---|---|
| 0 | 0 | 0 | 0 | 0 |
| 1 | 1 | 0 | 0 | 0 |
| 2 | 0 | 2 | 0 | 1 |
| 0 | 1 | 0 | 2 | 0 |
| 1 | 1 | 0 | 2 | 2 |

TABLE 4

Time = 4

| | | | | |
|---|---|---|---|---|
| 2 | 0 | 0 | 0 | 0 |
| 1 | 1 | 0 | 1 | 0 |
| 2 | 0 | 2 | 0 | 2 |
| 0 | 2 | 0 | 2 | 0 |
| 1 | 2 | 0 | 0 | 2 |

TABLE 5

Time = 5

| | | | | |
|---|---|---|---|---|
| 1 | 0 | 0 | 0 | 1 |
| 2 | 1 | 0 | 2 | 0 |
| 1 | 1 | 2 | 0 | 0 |
| 0 | 2 | 0 | 0 | 0 |
| 0 | 2 | 0 | 0 | 2 |

TABLE 6

Time = 6

| | | | | |
|---|---|---|---|---|
| 0 | 1 | 0 | 0 | 2 |
| 1 | 0 | 0 | 0 | 0 |
| 0 | 0 | 2 | 0 | 1 |

TABLE 6-continued

Time = 6

| | | | | |
|---|---|---|---|---|
| 0 | 0 | 0 | 0 | 0 |
| 2 | 0 | 0 | 0 | 2 |

Each of the matrices in Tables 1–6 represents a reading of the expression levels of 25 genes at a point in time. Each cell in the matrices of Tables 1–6 represents the expression level of a particular gene. Tables 1–6 represent the gene expression levels for each of the 25 genes at six successive points in time. Each gene can have an expression level of 0, 1, or 2. Level 0 indicates that the gene is not expressed, level 1 indicates that the gene is expressed at some low or mid-level value, and level 2 indicates that the gene is highly expressed. The upper left-hand corner cell in Tables 1–6 represents the expression level of gene 1, and the lower right-hand cell of Tables 1–6 represent the expression level of gene 25. The numbers of genes corresponding to the cells increase horizontally from left to right in ascending order, and increase from top to bottom. Thus, for example, the five cells in the top horizontal row of the matrices in Tables 1–6 contain the expression levels of genes 1, 2, 3, 4, and 5, respectively, and the five cells in the second row of Tables 1–6 contain expression levels for genes 6, 7, 8, 9, and 10, respectively.

It should be noted that the 25 different gene expression levels in each of Tables 1–6 are a very small, hypothetical example used for illustration purposes. In general, the expression levels of many hundreds or thousands of genes may be detected on a single molecular array. In actual cases, Tables 1–6 would each contain many hundreds or thousands of numerical representations of expression levels. It is in these actual cases, where hand calculations are impractical or infeasible, that the power of the partitioning method of the currently described embodiment of the present invention is especially valuable. Moreover, while in the current example only 3 different levels of expression are shown, expression level values may measured over large continuous range or real numbers or over a wide range of discrete values, and may be expressed directly or as logarithms or as the result of various other transcendental or other mathematical functions applied to the measured expression-level values. In the current example, it is natural to represent the data as a series of matrices corresponding to gene arrays, and natural to represent expression data for individual genes, below, as columns within large matrices. However, many different representation methodologies may be employed. The method and the system of the present invention are not limited to specific representations of data, such as numerical representations within matrices or vectors.

The goal of cluster analysis is to partition genes 1–25 into smaller subsets of genes that exhibit similar expression patterns over the six time-ordered expression level measurements represented by Tables 1–6. For example, consider the expression levels of genes 2 and 5. In the first measurement, represented by Table 1, gene 2 has an expression level of 1 and gene 5 has an expression level of 2. Thus, in the measurement at time 1, both genes are expressed. Similarly, at time 2, represented by the expression levels shown in Table 2, both genes 2 and 5 are expressed. At time 3, shown in Table 3, the expression levels of both genes 2 and 5 decrease to level 0, indicating that they are not expressed at time 3. Similarly, neither gene 2 nor gene 5 is expressed at time 4, as seen in the gene expression levels shown in Table 4. At time 5, gene 5 is again expressed at expression level 1, and at time 6, both genes 2 and 5 are expressed. In this experiment, genes 2 and 5 exhibit a similar, though not identical, expression pattern. Both are initially expressed, expression levels of both genes falls to 0 toward the middle time periods of the experiment, and both genes are again expressed at the end of the experiment. Thus, it would be logical to partition genes 2 and 5 together as members of one cluster during cluster analysis, and logical to conclude that the functions of their gene products may be somehow related. It is the goal of cluster analysis, in this case, to assign each of the 25 genes to a cluster.

In the described embodiment, the first step in cluster analysis is to prepare a similarity matrix in which the similarity, or relatedness, of gene expression between each possible pair of genes is tabulated. The preparation of the similarity matrix occurs in three steps. In the first step, an 11-dimensional vector is constructed for each gene. The 11-dimensional vector is a representation of the expression behavior of that gene. Table 7, below, contains the 11-dimensional vectors, in vertical columns, for each of the 25 genes whose expression patterns are displayed in Tables 1–6.

Table 1 above. That expression level is 0. The third value in the 11-dimensional vector constructed for gene 1 is the expression level of gene 1 measured at time 2, shown above in Table 2. The second, intervening value, in the 11-dimensional vector is the difference, or $\Delta$, between the expression level measured at time 2 and the expression level measured at time 1. Since there was no difference between the expression levels at times 1 and 2, the $\Delta$ is 0. Similarly, the remaining four expression level measurements are successively included in the 11-dimensional vector separated by $\Delta$ differences between each expression level and the previous expression level. For example, the expression level of gene 1 was 0 at time 3 and 2 at time 4, represented in the 11-dimensional vector by the values "0" in the fifth row and "2" in the seventh row. Because the difference between the expression at time 4 and the expression level at time 3 is 2−0=2, the value in the sixth row is "2," representing the $\Delta$ between time 3 and time 4. The $\Delta$ differences are included within the vector representation of the gene expression behavior for each gene in order to account for and emphasize the temporal changes in expression levels between successive measurements.

A second, optional step in the preparation of the similarity matrix is normalization of the 11-dimensional vectors pre-

TABLE 7

| | | | | | | | | | | | Gene # | | | | | | | | | | | | | | |
|---|---|---|---|---|---|---|---|---|---|---|---|---|---|---|---|---|---|---|---|---|---|---|---|---|---|
| time | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| 1 | 0 | 1 | 0 | 0 | 2 | 0 | 0 | 0 | 0 | 1 | 0 | 0 | 2 | 0 | 0 | 0 | 0 | 0 | 2 | 0 | 0 | 0 | 0 | 0 | 2 |
| $\Delta$ | 0 | 0 | 0 | 0 | −1 | 0 | 0 | 0 | 0 | −1 | 1 | 0 | 0 | 0 | 1 | 0 | 1 | 0 | 0 | 0 | 0 | 1 | 0 | 0 | 0 |
| 2 | 0 | 1 | 0 | 0 | 1 | 0 | 0 | 0 | 0 | 0 | 1 | 0 | 2 | 0 | 1 | 0 | 1 | 0 | 2 | 0 | 0 | 1 | 0 | 0 | 2 |
| $\Delta$ | 0 | −1 | 0 | 0 | −1 | 1 | 1 | 0 | 0 | 0 | 1 | 0 | 0 | 0 | 0 | 0 | 0 | 0 | 0 | 0 | 1 | 0 | 0 | 0 | 0 |
| 3 | 0 | 0 | 0 | 0 | 0 | 1 | 1 | 0 | 0 | 0 | 2 | 0 | 2 | 0 | 1 | 0 | 1 | 0 | 2 | 0 | 1 | 1 | 0 | 0 | 2 |
| $\Delta$ | 2 | 0 | 0 | 0 | 0 | 0 | 0 | 0 | 10 | 0 | 0 | 0 | 0 | 0 | 1 | 0 | 1 | 0 | 0 | 0 | 0 | 1 | 0 | 0 | 0 |
| 4 | 2 | 0 | 0 | 0 | 0 | 1 | 1 | 0 | 1 | 0 | 2 | 0 | 2 | 0 | 2 | 0 | 2 | 0 | 2 | 0 | 1 | 2 | 0 | 0 | 2 |
| $\Delta$ | −1 | 0 | 0 | 0 | 1 | 1 | 0 | 0 | 1 | 0 | −1 | 1 | 0 | 0 | −2 | 0 | 0 | 0 | −2 | 0 | −1 | 0 | 0 | 0 | 0 |
| 5 | 1 | 0 | 0 | 0 | 1 | 2 | 1 | 0 | 2 | 0 | 1 | 1 | 2 | 0 | 0 | 0 | 2 | 0 | 0 | 0 | 0 | 2 | 0 | 0 | 2 |
| $\Delta$ | −1 | 1 | 0 | 0 | 1 | −1 | −1 | 0 | −2 | 0 | −1 | −1 | 0 | 0 | 1 | 0 | −2 | 0 | 0 | 0 | 2 | −2 | 0 | 0 | 0 |
| 6 | 0 | 1 | 0 | 0 | 2 | 1 | 0 | 0 | 0 | 0 | 0 | 0 | 2 | 0 | 1 | 0 | 0 | 0 | 0 | 0 | 2 | 0 | 0 | 0 | 2 |

The construction of the 11-dimensional vectors will be described with reference to the 11-dimensional vector constructed for gene 1 that appears in the left-most column of Table 7. The first value in the 11-dimensional vector is the expression level measured for gene 1 at time 1, shown in pared in the first step. In the normalization process, all vectors of non-0 length are scaled to a single uniform length. Table 8, below, contains the normalized vectors corresponding to the non-normalized vectors contained in Table 7.

TABLE 8

| | | | | | Gene # | | | | | | | |
|---|---|---|---|---|---|---|---|---|---|---|---|---|
| time | 1 | 2 | 3 | 4 | 5 | 6 | 7 | 8 | 9 | 10 | 11 | 12 |
| 1 | 0 | 1/3 | 0 | 0 | 1/3 | 0 | 0 | 0 | 0 | 1 | 0 | 0 |
| $\Delta$ | 0 | 0 | 0 | 0 | −1/6 | 0 | 0 | 0 | 0 | −1 | 1/6 | 0 |
| 2 | 0 | 1/3 | 0 | 0 | 1/6 | 0 | 0 | 0 | 0 | 0 | 1/6 | 0 |
| $\Delta$ | 0 | −1/3 | 0 | 0 | −1/6 | 1/6 | 1/3 | 0 | 0 | 0 | 1/6 | 0 |
| 3 | 0 | 0 | 0 | 0 | 0 | 1/6 | 1/3 | 0 | 0 | 0 | 1/3 | 0 |
| $\Delta$ | 2/3 | 0 | 0 | 0 | 0 | 0 | 0 | 0 | 1/3 | 0 | 0 | 0 |
| 4 | 2/3 | 0 | 0 | 0 | 0 | 1/6 | 1/3 | 0 | 1/3 | 0 | 1/3 | 0 |
| $\Delta$ | −1/3 | 0 | 0 | 0 | 1/6 | 1/6 | 0 | 0 | 1/3 | 0 | −1/6 | 1 |
| 5 | 1/3 | 0 | 0 | 0 | 1/6 | 1/3 | 1/3 | 0 | 2/3 | 0 | 1/6 | 1 |
| $\Delta$ | −1/3 | 1/3 | 0 | 0 | 1/6 | −1/6 | −1/3 | 0 | −2/3 | 0 | −1/6 | −1 |
| 6 | 0 | 1/3 | 0 | 0 | 1/3 | 1/6 | 0 | 0 | 0 | 0 | 0 | 0 |
| | | | | | Gene # | | | | | | | |
| time | 13 | 14 | 15 | 16 | 17 | 18 | 19 | 20 | 21 | 22 | 23 | 24 | 25 |
| 1 | 1/6 | 0 | 0 | 0 | 0 | 0 | 1/3 | 0 | 0 | 0 | 0 | 0 | 1/6 |
| $\Delta$ | 0 | 0 | 1/6 | 0 | 1/6 | 0 | 0 | 0 | 0 | 1/6 | 0 | 0 | 0 |

TABLE 8-continued

| | | | | | | | | | | | | | |
|---|---|---|---|---|---|---|---|---|---|---|---|---|---|
| 2 | 1/6 | 0 | 1/6 | 0 | 1/6 | 0 | 1/3 | 0 | 0 | 1/6 | 0 | 0 | 1/6 |
| Δ | 0 | 0 | 0 | 0 | 0 | 0 | 0 | 0 | 1/6 | 0 | 0 | 0 | 0 |
| 3 | 1/6 | 0 | 1/6 | 0 | 1/6 | 0 | 1/3 | 0 | 1/6 | 1/6 | 0 | 0 | 1/6 |
| Δ | 0 | 0 | 1/6 | 0 | 1/6 | 0 | 0 | 0 | 0 | 1/6 | 0 | 0 | 0 |
| 4 | 1/6 | 0 | 1/3 | 0 | 1/3 | 0 | 1/3 | 0 | 1/6 | 1/3 | 0 | 0 | 1/6 |
| Δ | 0 | 0 | −1/3 | 0 | 0 | 0 | −1/3 | 0 | −1/6 | 0 | 0 | 0 | 0 |
| 5 | 1/6 | 0 | 0 | 0 | 1/3 | 0 | 0 | 0 | 0 | 1/3 | 0 | 0 | 1/6 |
| Δ | 0 | 0 | 1/6 | 0 | −1/3 | 0 | 0 | 0 | 1/3 | −1/3 | 0 | 0 | 0 |
| 6 | 1/6 | 0 | 1/6 | 0 | 0 | 0 | 0 | 0 | 1/3 | 0 | 0 | 0 | 1/6 |

Finally, the similarity matrix is computed from the normalized vectors contained in Table 8. In the current case, the L1 distance between each pair of vectors is computed. The L1 distance between two 11-dimensional vectors "$V_a$" and "$V_b$" is mathematically expressed as follows:

$$L1_{VaVb} = \sum_{i=1}^{11} |V_{b_i} - V_{a_i}|$$

The L1 distances between each of the 25 11-dimensional normalized vectors shown in Table 8 have been computed and included below, in the symmetric matrix of Table 9 ing the following formula to each L1 value:

$$S_{ab} = 1 - \frac{L1_{VaVb}}{\max L1}$$

where $S_{ab}$ is the similarity between genes a and b, $L1_{VaVb}$ is the L1 distance between the vector representations of the gene behavior of genes a and b, and max L1 is the maximum L1 distance observed between any two vectors constructed to represent the gene expression of the individual genes in the experiment. It should be noted and emphasized that this L1-distance-based similarity matrix is only one possible similarity matrix that can be calculated for this experiment.

TABLE 9

Gene #

| | | | | | | | | | | | | | | | | | | | | | | | | |
|---|---|---|---|---|---|---|---|---|---|---|---|---|---|---|---|---|---|---|---|---|---|---|---|---|
| 2 | 4 | | | | | | | | | | | | | | | | | | | | | | | | |
| 3 | 7/3 | 5/3 | | | | | | | | | | | | | | | | | | | | | | | |
| 4 | 7/3 | 5/3 | 0 | | | | | | | | | | | | | | | | | | | | | | |
| 5 | 1/3 | 1 | 5/3 | 5/3 | | | | | | | | | | | | | | | | | | | | | |
| 6 | 7/3 | 8/3 | 4/3 | 4/3 | 2 | | | | | | | | | | | | | | | | | | | | |
| 7 | 2 | 10/3 | 5/3 | 5/3 | 3 | 1 | | | | | | | | | | | | | | | | | | | |
| 8 | 7/3 | 5/3 | 0 | 0 | 5/3 | 4/3 | 5/3 | | | | | | | | | | | | | | | | | | |
| 9 | 2 | 4 | 7/3 | 7/3 | 10/3 | 2 | 2 | 7/3 | | | | | | | | | | | | | | | | | |
| 10 | 13/3 | 9/3 | 2 | 2 | 8/3 | 10/3 | 11/3 | 2 | 13/3 | | | | | | | | | | | | | | | | |
| 11 | 7/3 | 9/3 | 5/3 | 5/3 | 8/3 | 4/3 | 1 | 5/3 | 8/3 | 11/3 | | | | | | | | | | | | | | | |
| 12 | 4 | 10/3 | 3 | 3 | 4 | 3 | 10/3 | 3 | 2 | 5 | 4 | | | | | | | | | | | | | | |
| 13 | 8/3 | 5/3 | 1 | 1 | 4/3 | 1 | 5/3 | 1 | 8/3 | 8/3 | 4/3 | 11/3 | | | | | | | | | | | | | |
| 14 | 7/3 | 5/3 | 0 | 0 | 5/3 | 4/3 | 5/3 | 0 | 7/3 | 2 | 5/3 | 3 | 1 | | | | | | | | | | | | |
| 15 | 7/3 | 7/3 | 5/3 | 5/3 | 7/3 | 2 | 7/3 | 5/3 | 3 | 11/3 | 4/3 | 14/3 | 4/3 | 5/3 | | | | | | | | | | | |
| 16 | 7/3 | 5/3 | 0 | 0 | 5/3 | 4/3 | 5/3 | 0 | 7/3 | 2 | 5/3 | 3 | 1 | 0 | 5/3 | | | | | | | | | | |
| 17 | 5/3 | 9/3 | 5/3 | 5/3 | 8/3 | 4/3 | 1 | 5/3 | 5/3 | 11/3 | 1 | 10/3 | 4/3 | 5/3 | 4/3 | 5/3 | | | | | | | | | |
| 18 | 7/3 | 5/3 | 0 | 0 | 5/3 | 4/3 | 5/3 | 0 | 7/3 | 2 | 5/3 | 3 | 1 | 0 | 5/3 | 0 | 5/3 | | | | | | | | |
| 19 | 8/3 | 2 | 5/3 | 5/3 | 7/3 | 7/3 | 2 | 5/3 | 10/3 | 3 | 4/3 | 14/3 | 4/3 | 5/3 | 4/3 | 5/3 | 2 | 5/3 | | | | | | | |
| 20 | 7/3 | 5/3 | 0 | 0 | 5/3 | 4/3 | 5/3 | 0 | 7/3 | 2 | 5/3 | 3 | 1 | 0 | 5/3 | 0 | 5/3 | 0 | 5/3 | | | | | | |
| 21 | 9/3 | 5/3 | 4/3 | 4/3 | 2 | 4/3 | 2 | 4/3 | 10/3 | 10/3 | 5/3 | 13/3 | 4/3 | 4/3 | 4/3 | 4/3 | 7/3 | 4/3 | 2 | 4/3 | | | | | |
| 22 | 5/3 | 9/3 | 5/3 | 5/3 | 8/3 | 4/3 | 1 | 5/3 | 5/3 | 11/3 | 1 | 10/3 | 4/3 | 5/3 | 4/3 | 5/3 | 0 | 5/3 | 2 | 5/3 | 7/3 | | | | |
| 23 | 7/3 | 5/3 | 0 | 0 | 5/3 | 4/3 | 5/3 | 0 | 7/3 | 2 | 5/3 | 3 | 1 | 0 | 5/3 | 0 | 5/3 | 0 | 5/3 | 0 | 4/3 | 5/3 | | | |
| 24 | 7/3 | 5/3 | 0 | 0 | 5/3 | 4/3 | 5/3 | 0 | 7/3 | 2 | 5/3 | 3 | 1 | 0 | 5/3 | 0 | 5/3 | 0 | 5/3 | 0 | 4/3 | 5/3 | 0 | | |
| 25 | 8/3 | 5/3 | 1 | 1 | 4/3 | 1 | 4/3 | 1 | 8/3 | 8/3 | 4/3 | 11/3 | 0 | 1 | 4/3 | 1 | 4/3 | 1 | 4/3 | 1 | 4/3 | 4/3 | 1 | 1 |
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | |

Gene #

Thus, Table 9 contains the L1 distances between each pair of 11-dimensional vectors. For example, $L1_{V1V2}$ has the value "4," shown in the upper left most cell of Table 9 indexed by 1, along the lower, horizontal row of indices, and 2, at the top of the vertical column of indices.

The similarity matrix can be calculated from the L1 distance matrix of Table 9 by simple arithmetic manipulation. Similarity values are chosen to range from 0 to 1, with a similarity value of 1 indicating identical expression behavior, and a similarity value of 0 indicating unrelated gene expression behavior. The L1 distances shown above, in Table 9, can be transformed into similarity values by apply- Vectors of different dimensions may be constructed to account for, and emphasize, different features of the gene expression behaviors, vector comparisons other than the L1 distance between vectors can be employed, and a variety of different formulas can be used to normalize constructed vectors and to calculate a similarity value from various possible normalized vectors. As one example, the Δ differences included in the 11-dimensional vectors can be omitted, and 6-dimensional vectors that include only gene expression values can be used. As another example, a non-linear normalization could be employed to emphasize certain ranges of gene expression similarities and differences.

Moreover, Euclidean distance metrics may alternatively be employed, or various other correlation metrics, such as the Pearson correlation, may serve as the basis for computing the similarity matrix. The current example is provided primarily for illustrative purposes and includes one possible approach to calculating a similarity matrix.

FIG. 5 shows an abstract, pseudo-code implementation of a gene expression cluster analysis system based on the present invention. Most of the above abstract pseudo-code implementation shown in FIG. 5 is similar to the previously described, graph-theoretical pseudo-code implementation, but rather than designed to receive a graph, as input, the current implementation is designed to receive, as input, a set of data points, a similarity matrix expressing the similarity between each possible pair-wise combination of data points, and a cutoff parameter. In the present case, the data points, or entities, are the 25 genes whose expression levels are monitored in the experiment illustrated using Tables 1–6. The similarity matrix is a symmetric matrix including the $S_{ab}$ values calculated according to the above equation applied to the vector distance values shown in Table 9. The cutoff parameter can be varied to provide different clustering. Generally, higher cutoff values produce more numerous, smaller clusters and lower cutoff values produce a smaller number of larger clusters.

On line 1, the similarity matrix "$\Sigma$" and a cutoff parameter "t." are passed to the pseudo-code implementation. The pseudo-code implementation of FIG. 5 uses many of the same set variables as were employed in the previous, graph-theoretical pseudo-code implementation, including: (1) "C," a collection of identified clusters; (2) "$C_{Open}$," the cluster currently being constructed; and (3) "U," the set of entities, or nodes, not yet assigned to a cluster. In the current pseudo-code implementation, the array "a" includes affinity values that represent the affinity between entities or, in the context of the present example, genes, and the aggregate entities currently contained in the cluster "$C_{Open}$." Thus, the values in array "a" are roughly equivalent to the values returned by the function "d2C" of the previous graph-theoretical pseudo-code implementation. These variables are initialized on lines 3–6, where the collection of clusters "$C_{Open}$" is set to the null set, the currently constructed cluster "$C_{Open}$" is set to the null set, the set of unassigned entities "U" is set to the total entities being considered, and all values in the affinity array "a" are set to 0.

The pseudo-code implementation of FIG. 5 consists of a single while-loop comprising lines 8–30. This while-loop iterates until there are no longer any unassigned entities and the currently constructed cluster "$C_{Open}$" is the null set. On line 9, the variable "u" is set to the element with maximal affinity for the currently constructed cluster "$C_{Open}$." Note that if the current iteration is the first iteration for a newly opened, currently constructed cluster that contains no entities, all unassigned elements have 0 affinity, and so an entity must be arbitrarily selected and assigned to the variable "u." If the entity "u" having maximal affinity for the currently constructed cluster, has an affinity greater than the cutoff parameter "t" multiplied by the average value of the affinities for $C_{Open}$ of the entities already in $C_{Open}$, then the entity "u" is considered to be of high affinity, as detected on line 10 by the current pseudo-code implementation. When the selected entity "u" has high affinity for $C_{Open}$, the selected entity is added to $C_{Open}$ on line 11 and removed from the set of unassigned entities "U" on line 12. Next, in the for-loop comprising lines 13–14, the affinities of all the unassigned entities in the set "U" and in $C_{Open}$ are adjusted to reflect the inclusion of the selected entities in $C_{Open}$. The affinity array "a" values are adjusted by adding, to the similarity value for each entity in the set of unassigned entities "U" and in $C_{Open}$, the similarity between that entity and the selected high-affinity entity. If the set of unassigned entities "U" does not contain any high-affinity entities, then the pseudo-code implementation resumes execution at line 17. First, on line 17, an entity "v," with a minimal affinity for $C_{Open}$ is selected from among the entities already contained in $C_{Open}$. If the affinity of the selected entity "v" is less than the cutoff parameter "t" multiplied by the average affinity of the entities contained in $C_{Open}$, as detected on line 18, then the selected entity "v" is removed from $C_{Open}$ on line 19 and returned to the set of unassigned entities on line 20. Following the removal of the selected entity "v" from $C_{Open}$, the affinities of all entities in the set of unassigned entities "U" and in $C_{Open}$ are adjusted to reflect the removal of the selected entity "v" from $C_{Open}$. This adjustment is made by subtracting from the affinity value stored in affinity array "a" for each entity in U and $C_{Open}$ the similarity between that entity. and the selected entity "v." If, on the other hand, no low affinity entity can be found in $C_{Open}$, then $C_{Open}$ is added to the collection of identified clusters "C" on line 25, $C_{Open}$ is set to the null set on line 26, and the values in the affinity array "a" are reset to 0 on line 17.

Thus, the chief differences between the graph theoretical pseudo-code implementation, presented above, and the pseudo-code implementation of FIG. 5 reside in employment of the similarity matrix in the pseudo-code implementation of FIG. 5 in place of the graph theoretical function "d2C" in the graph-theoretical pseudo-code implementation and the employment of a cutoff parameter "t" in the pseudo-code implementation of FIG. 5 in contrast to the fixed cutoff value of ½ employed in the graph-theoretical pseudo-code implementation.

C++-like Pseudo-Code Implementation

A C++-like pseudo-code implementation of an embodiment of the present invention is provided below. This C++-like pseudo-code implementation is specifically implemented to perform a cluster analysis on the experimental data presented above in Tables 1–6, and has been fully implemented, compiled, and run on the data presented in Tables 1–9 to produce the results shown below, in Table 10.

The C++-like pseudo-code implementation includes three class declarations for the classes "nodes," "cluster," and "clusters," and includes implementations of a number of methods of the class "clusters." Implementations of the methods of the classes "node" and "cluster" are not shown for the sake of brevity. Methods for which implementations are not shown are straightforwardly implementable, and may be implemented in various ways depending on efficiency criteria and coding style preferences. Many different class organizations, implementation details, languages, and data structures can be used to provide an illustrative implementation of an embodiment of the present invention. The choices made in the implementation provided below reflect a desire to provide a concise, easily understandable illustration.

The first declared class in the C++-like pseudo-code implementation is the class "nodes." The declaration for this class is shown below:

```
1    class nodes
2    {
3         private:
4              float   node_values[ ][ ];
5              float   cutoff;
6
7         public:
8              float   getSim(int i, int j);
9              float   getCutoff( );
10             void    setCutoff(float x);
11             int     getNum( );
12             nodes(floatx);
13             virtual ~nodes( );
14   };
```

Class "nodes" contains two data members: "node_values," a similarity matrix, and "cutoff," the cutoff parameter to be used for determining whether a particular entity from the data set, using the example presented in the previous subsection, has a low affinity or a high affinity towards a currently constructed cluster. These data members are declared above on lines 4–6. The class "nodes" contains the following member functions: (1) "getSim," declared above on line 8, which returns the similarity value from the similarity matrix that expresses the relatedness of entities "i" and "j," where i and j are supplied as arguments; (2) "getCutoff," declared above on line 9, which returns the cutoff parameter to be used in the cluster analysis; (3) "setCutoff," declared above on line 10, which sets the cutoff parameter to the value supplied as argument "x"; (4) "getNum," declared above on line 11, which returns the total number of nodes in the initial set of nodes to be partitioned; (5) a constructor "nodes"; and (6) a destructor "~anodes." Thus, the class "nodes" encapsulates the numerically ordered set of nodes that are to be partitioned, the similarity matrix expressing the relatedness between each pair of nodes, and a cutoff parameter.

A declaration for the class "cluster" follows below:

```
1    class cluster
2    {
3         private:
4              int*       nodeList
5              cluster*   next;
6              int        num;
7              int        size;
8
9         public:
10             int        getNum( );
11             void       addNode(int i);
12             void       deleteNode(int i);
13             int        getFirstNode( );
14             int        getNodel(int i);
15             cluster*   getNext( );
16             void       setNext(cluster *c);
17             void       clear( );
18             cluster( );
19             cluster(int i);
20             virtual    ~cluster( );
21   };
```

The class cluster describes a single cluster, or partition, comprising a subset of related entities. The result of clustering analysis is a linked list of instantiated cluster objects, each instantiated cluster object representing a single subset of the related nodes identified by cluster analysis. The class "cluster" includes the following four data members, declared above on lines 4–7: (1) "nodeList," a pointer to an array of integers that contains integer representations of the nodes within the cluster; (2) "next," a pointer to the next instantiated cluster object in the linked list of cluster objects that together compose the results of cluster analysis; (3) "num," the number of nodes within the cluster; and (4) "size," the current size of the integer array "nodeList." The class "cluster" includes the following member functions declared above on lines 10–20: (1) "getNum," which returns the number of nodes currently contained within the cluster; (2) "addNode," which adds the node supplied as argument "i" to the cluster; (3) "deleteNode," which removes the node identified by the argument "i" from the cluster; (4) "getFirstNode," which returns the first node contained in the cluster, or, in other words, the first integer in the integer array "nodeList"; (5) "getNodel," which returns the ith node contained in the cluster; (6) "getNext," which returns a pointer to the next instantiated cluster object in a linked list of cluster objects; (7) "setNext," which links the current cluster object data member "next" to reference the cluster object referenced by the argument "c"; (8) "clear," a reset function that sets the cluster to the null set; (9) an argumentless constructor "cluster"; (10) a constructor that initializes the cluster to include nodes 0 through i, where i is supplied as an argument; and (11) the destructor "~cluster."

A declaration for the class "clusters" is provided below:

```
1    class clusters
2    {
3         private:
4              cluster*   clusterList;
5              float*     affinities;
6              nodes*     originalNodes;
7              cluster*   Copen;
8
9         public:
10             bool       openNew( );
11             bool       assignHighAffUnassignedNode( );
12             bool       deassignLowAffOpenNode( );
13             void       jumpForward( );
14             clusters(nodes *n);
15             virtual    ~clusters( );
16   };
```

The class "clusters" includes four data members, declared above on lines 4–7: (1) "clusterList," a list of clusters that starts with a cluster representing all unassigned nodes or entities and followed by all the clusters constructed by cluster analysis; (2) "affinities," an array of floating point numbers that represents the affinities of the unassigned nodes and nodes contained within the currently constructed cluster for the currently constructed cluster; (3) "originalNodes," a pointer to an instantiated nodes object that represents the similarity matrix and cutoff parameter for the cluster analysis; and (4) "Copen," a pointer to an instantiated cluster object contained in the instantiated cluster object list "clusterList" that represents the currently constructed cluster. The class "clusters" contains the following six function members, declared above on lines 10–15: (1) "openNew," which instantiates a new cluster object and links it at the end of the list of cluster objects "clusterList"; (2) "assignHighAffUnassignedNode," a member function that attempts to select a high-affinity unassigned node and assign it to the currently constructed cluster; (3) "deassignLowAffOpenNode," a member function that attempts to remove a low-affinity node from the currently constructed cluster; (4) "jumpForward," a member function that attempts to promote entities from earlier created clusters to later created clusters for which the entities have greater affinity; (5) a constructor that takes the pointer to an instantiated nodes object; and (6) a destructor "~clusters."

Implementations for 5 of the member functions declared for the class "clusters" will now be discussed. An implementation for the member function "openNew" is provided below:

```
1   bool clusters::openNew( )
2   {
3       cluster* c;
4       int i;
5       float* p;
6
7       if (clusterList->getNum( ) <1) return false;
8       c = new cluster( );
9       if (Copen == NULL) clusterList -> setNext(c);
10      else Copen->setNext(c);
11      Copen = c;
12      p = affinities;
13      for (i = 0; i < originalNodes->getNum( ); i++)
14          *p++ = 0;
15      return true;
16  }
```

The member function "openNew" instantiates a new cluster object and initializes that object after placing it at the end of the list of clusters "clusterList." The member function "openNew" employs three local variables, declared above on lines 3–5, including a reference to a cluster, an integer, and a reference to a floating point number. On line 7, openNew determines whether there are any remaining unassigned entities by looking at the number of entities contained in the first cluster of the list of cluster objects "clusterList." If there are no unassigned entities remaining, then openNew returns the Boolean value "false." Otherwise, on line 8, openNew instantiates a new cluster referenced by local variable "c." If this is the first cluster constructed in the cluster analysis, as detected by openNew on line 9, then openNew sets, on line 9, the pointer "next" of the cluster representing the unassigned entities to point to the instantiated cluster. Otherwise, openNew sets, on line 10, the pointer "next" of the previously constructed cluster to point to the newly instantiated cluster. On line 11, openNew sets the member "Copen" to reference the newly instantiated cluster. On lines 12–14, openNew sets the affinities for all nodes to be 0. The affinities represent the affinity of each node for the currently constructed cluster referenced by Copen. Finally, on line 15, openNew returns the Boolean value "true."

An implementation of the clusters member function "assignHighAffUnassignedNode" is provided below:

```
1   bool clusters::assignHighAffUnassignedNode( )
2   {
3       int i, n, highN;
4       float nval, val, avg;
5
6       nval = -1;
7       if (clusterList->getNum( ) <1) return false;
8       if (Copen == NULL) openNew( );
9       if (Copen->getNum( ) <1)
10      {
11          highN = clusterList->getFirstNode( );
12          Copen->addNode(highN);
13          for (i = 0; i < clusterList->getNum( ); i++)
14          {
15              n = clusterList->getNodel(i);
16              *(affinities + n - 1) += originalNodes->getSim(n, highN);
17          }
18          clusterList->deleteNode(highN);
19          return true;
20      }
21      avg = 0;
22      for (i = 0; i < Copen->getNum( ); i++)
23      {
24          n = Copen->getNodel(i);
25          avg += *(affinities + n - 1);
26      }
27      }
28      avg = avg / Copen->getNum( );
29      for (i = 0; i clusterList->getNum( ); i++)
30      {
31          n = clusterList->getNodel(i);
32          val = *(affinities + n -1);
33          if (val > nval)
34          {
35              nval = val;
36              highN = n;
37          }
38      }
39      if (nval >= originalNodes->getCutoff( ) * avg)
40      {
41          Copen->addNode(highN);
42          clusterList->deleteNode(highN);
43          for (i = 0; i < Copen->getNum( ); i++)
44          {
45              n = Copen->getNodel(i);
46              *(affinities + n - 1) += originalNodes->getSim(n, highN);
47          }
48          for (i = 0; i < clusterList->getNum( ); i++)
49          {
50              n = clusterList->getNodel(i);
51              *(affinities + n - 1) += originalNodes->getSim(n, highN);
52          }
53          return true;
54      }
55      else return false;
56  }
```

The member function "AssignHighAffUnassignedNode" employs a number of integer and floating point local variables, declared above on lines 3–4. On line 7, AssignHighAffUnassignedNode determines whether there are any unassigned entities available. If not, then AssignHighAffUnassignedNode returns the Boolean value "false" on line 7, indicating that no high-affinity entities have been added to the currently constructed cluster. On line 8, AssignHighAffUnassignedNode determines whether or not a first cluster has been constructed for cluster analysis. If not, then AssignHighAffUnassignedNode calls the member function "openNew" on line 8 in order to open a first cluster to which entities will be assigned. On line 9, AssignHighAffUnassignedNode determines whether the currently constructed cluster, referenced by data member "Copen," contains at least one entity. If not, then AssignHighAffUnassignedNode executes lines 11–19 to select a first entity to include in the currently constructed cluster. There may be many alternative methods for selecting the first candidate for a cluster. In the current implementation, the first unassigned node is selected from the cluster containing unassigned entities on line 11, and that entity is added to the currently constructed cluster on line 12. Then, on lines 13–17, the affinities of all unassigned entities are adjusted to reflect their affinity for the single entity selected and added to the cluster. Finally, on line 19, the selected entity is deleted from the cluster representing the unassigned entities. Also, on line 19, AssignHighAffUnassignedNode returns the Boolean value "true" to indicate that a high-affinity unassigned node has been selected and added to the currently constructed cluster.

If, on the other hand, the currently constructed cluster already contains at least one entity, execution resumes at line 21. On lines 21–27, AssighAffUnassignedNode computes the average affinity towards the currently constructed cluster of all current entities of the currently constructed cluster. On lines 28–37, AssignHighAffUnassignedNode selects the unassigned entity with highest affinity towards the currently constructed cluster. If the highest affinity unassigned entity has an affinity greater than the product of the cutoff parameter and the average affinity computed on lines 21–27, as detected by AssignHighAffUnassignedNode on line 38, then on lines 40–52 AssignHighAffUnassignedNode adds the selected high-affinity entity to the currently constructed cluster, removes the selected entity from the cluster representing the unassigned entities, and adjusts the affinities of the unassigned entities and entities contained in the currently constructed cluster to reflect the addition of the selected entities to the currently constructed cluster. If the highest affinity unassigned entity has an affinity less than the product of the cutoff parameter and the average calculated on lines 21–27 then AssignHighAffUnassignedNode returns a Boolean value "false" to indicate that no high-affinity entity was added to the currently constructed cluster.

The member function "deassignLowAffOpenNode" is provided below:

no low-affinity entities contained within the currently constructed cluster have been identified and removed by deassignLowAffOpenNode. Otherwise, on lines 8–20, deassignLowAffOpenNode computes the average affinity for the currently constructed cluster of all entities contained within the currently constructed cluster as well as selecting the entity contained within the currently constructed cluster having the lowest affinity for the currently constructed cluster. If, as detected by deassignLowAffOpenNode on line 21, the selected entity within the currently constructed cluster has an affinity for the currently constructed cluster less than the product of the average, computed on lines 9–20, and the cutoff parameter then, on lines 23–35, deassignLowAffOpenNode removes the selected entity from the currently constructed cluster, adds the selected entity back to the cluster representing the unassigned entities, reassigns affinities to reflect removal of the selected entity from the currently constructed cluster, and returns the Boolean value "true" to indicate that a low-affinity entity, was removed from the currently constructed cluster. If, on the other hand, the lowest affinity entity currently contained in the currently constructed cluster has an affinity higher than or equal to the product of the average and the cutoff parameter, then deassignLowAffOpenNode returns the Boolean value "false" on line 37 to indicate that no low-affinity node has been removed from the currently constructed cluster.

```
1    bool clusters::deassignLowAffOpenNode( )
2    {
3        int i, n, lowN;
4        float nval, val, avg;
5
6        nval = 10000;
7        if (Copen->getNum( ) <1) return false;
8        avg = 0;
9        for (i = 0; i <Copen ->getNum( ); i++)
10       {
11           n = Copen->getNodel(i);
12           val = *(affinities + n - 1);
13           avg += val;
14           if (val < nval)
15           {
16               nval = val;
17               lowN = n;
18           }
19       }
20       avg = avg / Copen->getNum( );
21       if (nval < originalNodes->getCutoff( ) * avg)
22       {
23           Copen->deleteNode(lowN);
24           clusterList->addNode(lowN);
25           for (i = 0; i < Copen->getNum( ); i++)
26           {
27               n = Copen->getNodel(i);
28               *(affinities + n - 1) -= originalNodes->getSim(n, lowN);
29           }
30           for (i = 0; i < clusterList->getNum( ); i++)
31           {
32               n = clusterList->getNodel(i);
33               *(affinities + n - 1) -= originalNodes->getSim(n, lowN);;
34           }
35           return true;
36       }
37       else return false;
38   }
```

The member function "deassignLowAffOpenNode" utilizes a number of integer and floating point variables declared above on lines 3–4. If the currently constructed cluster contains no entities, as detected by deassignLowAffOpenNode on line 7, then deassignLowAffOpenNode returns the Boolean value "false" on line 7 to indicate that The member function "jumpForward" is employed towards the end of cluster analysis in order to allow entities assigned early during cluster analysis to move to later-constructed clusters for which the earlier assigned entities have greater affinity. Thus, the member function "jumpForward" is able to repartition the original sets of entities to a more optimal partitioning. A C++-like pseudo-code implementation of jumpForward is provided below:

```
1    void clusters::jumpForward( )
2    {
3         cluster tc;
4         cluster* p;
5         cluster* q;
6         cluster* preP;
7         float curAff, nextAff;
8         int i, j, n, m;
9
10        preP = clusterList;
11        p = clusterList->getNext( );
12        while(p ?= NULL)
13        {
14             q = p->getNext( );
15             while (q != NULL)
16             {
17                  for (i = 0; i < p->getNum( ); i++)
18                  {
19                       curAff = 0;
20                       nextAff = 0;
21                       n = p->getNodel(i);
22                       for (j = 0; j < p->getNum( ); j++)
23                       {
24                            m = p->getNodel(j);
25                            if (m != n) curAff += originalNodes->getSim (n, m);
26                       }
27                       curAff = curAff / (p->getNum( ) -1);
28                       for (j = 0; j < q->getNum( ); j++)
29                       {
30                            m = q->getNodel(j);
31                            nextAff += originalNodes->getSim (n,m);
32                       }
33                       nextAff = nextAff / q->getNum( );
34                       if (nextAff > curAff) tc.addNode(n);
35                  }
36                  for(i = 0;i < tc.getNum( ); i++)
37                  {
38                       n = tc.getNodel(i);
39                       p->deleteNode(n);
40                       q->addNode(n);
41                  }
42                  tc.clear( );
43                  if (p->getNum( ) < 1)
44                  {
45                       preP->setNext(q);
46                       delete p;
47                       p = q;
48                  }
49                  q = q->getNext( );
50             }
51             preP = p;
52             p = p->getNext( );
53        }
54   }
```

The member function "jumpForward" employs a number of local variables that reference clusters as well as local floating point and integer variables declared on lines 3–8, above. In the outer loop comprising lines 11–53, jumpForward considers each constructed cluster starting with the first constructed cluster. In the inner loop comprising lines 14–50, jumpForward compares the affinities for the currently considered cluster of the entities contained within the currently considered cluster to affinities of the entities contained within the currently considered cluster for subsequently constructed clusters, where the local variable "p" references the currently considered cluster and the local variable "q" references a subsequently constructed cluster. Any nodes identified within the inner loop having a higher affinity for a subsequently constructed cluster are added, on line 34; to the local cluster variable "tc." Then, on lines 36–41, these nodes are removed from the currently considered cluster and added to the subsequently constructed cluster. Thus, jumpForward allows nodes to migrate from earlier constructed clusters to later constructed clusters.

In an alternate implementation, further movement of nodes among clusters in order to further optimize clustering can be conducted following a first call to jumpForward. This further movement may occur as an additional iterative step, in each iteration of which: (1) the affinities of the nodes for their current clusters is compared to the affinities of the nodes for other clusters; (2) nodes having higher affinities to clusters other than their current clusters are marked for relocation to clusters for which they have highest affinities; and (3) all nodes marked for relocation are then relocated to clusters for which they have highest affinities. The additional iterative step may be iterated until either a stable clustering is obtained, where no node can be found with higher affinity for a cluster other than its current cluster, or until some fixed number of iterations have been performed. The fixed iteration cutoff of the latter case may necessary to insure that the additional iterative step terminates, rather than oscillating between two or more local optimal clusterings. Note that, in some implementations, nodes may be allowed to move only forward, to subsequently created clusters, as in the case of jumpForward, and that in other implementations, nodes may be allowed to move either forward or backward. Further alternate implementations may employ other well-known convergence techniques for efficiently seeking a more optimal clustering than the clustering obtained following the first execution of jumpForward.

A C++-like pseudo-code implementation of one constructor for the class "clusters" is provided below:

```
1   clusters::clusters(nodes *n)
2   {
3       clusterList = new cluster(n->getNum( ));
4       affinities = new float[n->getNum( )];
5       originatNodes = n;
6       Copen = NULL;
7   }
```

In this constructor, a cluster representing the entire set of nodes to be partitioned is instantiated and added to the list "clusterList" on line 3. The integer array "affinities" is created on line 4, and the data members "originalNodes" and "Copen" are initialized on lines 5 and 6.

Finally, a routine "findClusters" is provided to implement cluster analysis:

```
1   findClusters (nodes *n)
2   {
3       clusters c(n);
4
5       while (true)
6       {
7           if (~c. assignHighAffUnassignedNode( ))
8           {
9               if (!c.deassignLowAffOpenNode( ))
10
11              {
12                  if (!c.openNew( )) break;
13              }
```

```
14          }
15      }
16      c.jumpForward( );
17  }
```

The routine "findClusters" receives a reference to an instantiated "nodes" object via argument "n." On line 3, findClusters instantiates a local "clusters" object "c." In the while-loop comprising lines 5–15, findClusters continuously assigns high-affinity unassigned entities to the currently constructed cluster on line 7. When no high-affinity entities can be found, then findClusters removes low-affinity nodes from the currently-constructed cluster on line 9. When neither high-affinity unassigned entities nor low-affinity entities within the currently constructed cluster can be found, then findClusters opens a new cluster on line 12. The while-loop of lines 5–15 terminates when a new cluster cannot be opened because there are no remaining unassigned entities. Finally, on line 16, findClusters calls the clusters member function "jumpForward" to promote entities from earlier constructed clusters to later constructed clusters if entities have higher affinity for the later constructed clusters.

The results of a series of cluster analyses carried out on the gene expression data presented in Tables 1–6 by a full C++ implementation of the C++-like pseudo-code implementation provided above, using a similarity matrix generated from the distances between normalized vectors shown in Table 9 and using various cutoff parameters, are shown below in Table 10:

TABLE 10

| Cutoff Values | Clusters | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| 0.55 and 0.60 | 1, 17, 22, 7, 6, 11, 25, 13, 3, 4, 8, 14, 16, 18, 20, 23, 24, 21, 15, 19, 5, 2, 9, 10 | 12 | | | | | | | | | | | | | |
| 0.65 | 1, 17, 22, 7, 6, 11, 25, 13, 3, 4, 8, 14, 16, 18, 20, 23, 24, 21, 15, 19, 5, 2, 9 | 10 | 12 | | | | | | | | | | | | |
| 0.7 and 0.75 | 1 | 2, 5, 13, 25, 3, 4, 8, 14, 16, 18, 20, 23, 24, 21, 6, 15, 11, 19, 22, 17, 7 | 9 | 10 | 12 | | | | | | | | | | |
| 0.8 | 1 | 2, 5 | 3, 4, 8, 14, 16, 18, 20, 23, 24, 13, 25 | 6, 7, 11, 22, 17, 15, 19, 21 | 9 | 10 | 12 | | | | | | | | |
| 0.85, 0.9 and 0.95 | 1 | 2 | 3, 4, 8, 14, 16, 18, 20, 23, 24 | 5 | | 6 | 7 | 9 | | 10 | 11 | 12 | 13, 15 25 | 17, 22 | 19 | 21 |

The left-hand, vertical column in Table 10 lists the cutoff parameter or parameters used in one or more cluster analyses. For each listed cutoff parameter or parameters, the clustering produced by the C++ implementation using the listed parameter or parameters is shown in a horizontal row of numbered clusters. For example, using cutoff values of 0.55 or 0.60, the C++ implementation generates two clusters, the first cluster containing all genes other than number 12, and the second cluster containing gene 12. As can be seen in Table 10, a cutoff parameter of 0.80 generates 7 different clusters. The second cluster contains genes 2 and 5, that, according to the previous discussion, might reasonably expected to cluster together. The third cluster contains genes for which the expression does not change during the 6 measurements represented in Tables 1–6. The fourth cluster contains genes that are not expressed initially, are then expressed in the middle of the experiment, and that return to not being expressed at the end of the experiment. Using a cutoff parameter of 0.85, 0.9, or 0.95, by contrast, 15 different clusters are generated by the C++ implementation.

In general, cluster analysis may be carried out with a range of cutoff parameters in order to empirically select a cutoff parameter that generates a desirable level of discrimination. In the present case, for example, cutoff parameters less than 0.80 produce too few clusters, and cutoff parameters greater than 0.80 produce too many clusters. In one approach to selecting a cutoff parameter for a particular cluster analysis, the clustering produced by each different cutoff parameter may be scored according to the following formula:

score=(number of big clusters)*(total size of big clusters)

where big clusters are clusters containing more than some percentage of the total number of vectors, genes, or nodes that are being partitioned by an embodiment of the present invention. For example, if big clusters are defined, in the present example, as clusters containing more than 30% of the genes, then the clustering shown above in Table 10 can be associated with scores as shown below, in Table 11:

TABLE 11

| Cutoff Values | Score |
| --- | --- |
| 0.55 and 0.60 | 1 * 24 = 24 |
| 0.65 | 1 * 23 = 23 |
| 0.7 and 0.75 | 1 * 21 = 21 |
| 0.8 | 2 * (11 + 8) = 38 |
| 0.85, 0.9, and 0.95 | 1 * 9 = 9 |

According to this scoring method, the cutoff parameter 0.8 is clearly preferred. In fact, the cutoff parameter 0.8 is preferred, in the present example, when the threshold for big clusters falls between 4% of the genes and 36% of the genes.

Figure 6:
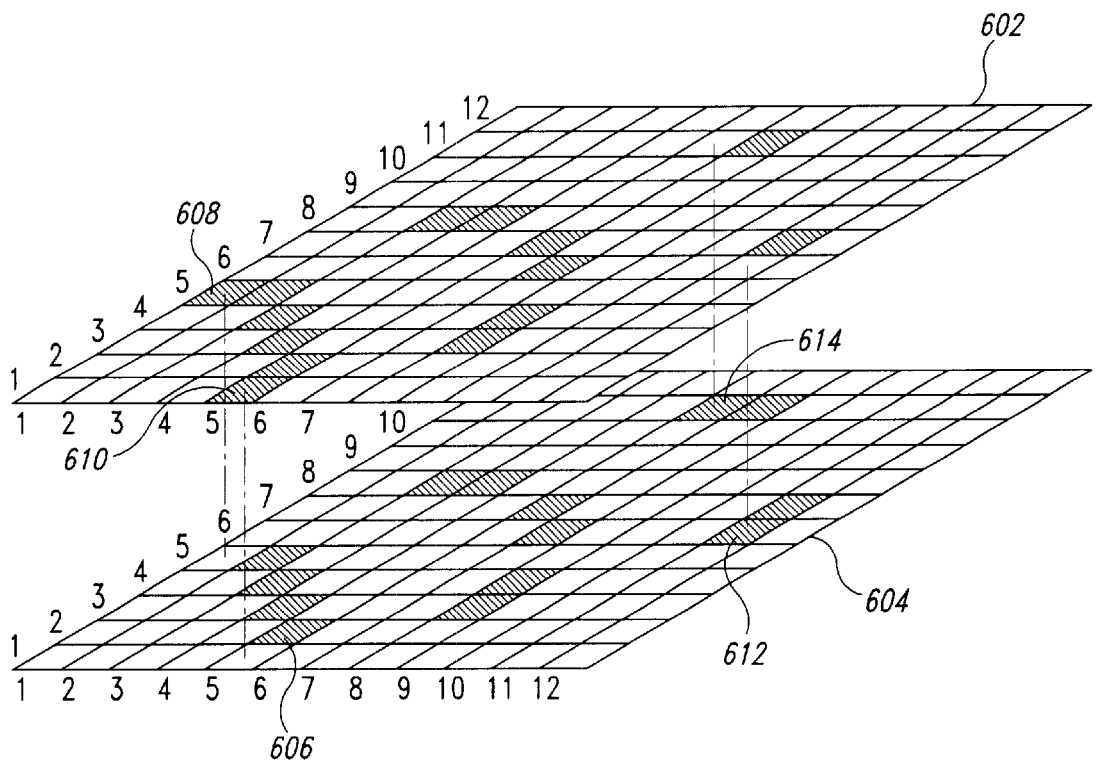
FIG. 6 illustrates one general approach to cutoff parameter determination.

There are alternative methods for choosing a cutoff parameter. FIG. 6 illustrates one general approach to cutoff parameter determination. In FIG. 6, a representation of some extrinsic or intrinsic information regarding desired clustering 602 is shown overlaying a representation of the clustering 604 produced by an embodiment of the current invention using a particular cutoff parameter. In FIG. 6, for example, the 12×12 matrix 604 is generated from the results of clustering analysis shown in Table 10 for first 12 genes. A filled cell, such as filled cell 606, indicates that the two genes indexing the cell are clustered together. The 12×12 matrix 602 represents an initial indication of clustering within the first 12 genes of the above example, obtained from Table 9, where a filled cell indicates that the two genes indexing the filled cell have a vector distance less than or equal to 1. Thus, in this case, the 12×12 matrix 602 represents intrinsic clustering information obtained from the initial data. Comparison of matrices 602 and 604 reveals that, in the initial vector-distance information, there are positive indications 608 and 610 that gene 1 and gene 5 should cluster together, but that, in the clustering analysis results, gene 1 and gene 5 do not reside together in a single cluster. Conversely, the clustering analysis results include indications 612 and 614 that gene 6 and gene 11 reside in one cluster, but the initial vector-distance information represented by matrix 602 does not indicate that genes 6 and 11 should cluster together. A score based on tallying such discrepancies between the intrinsic information represented by matrix 602 and the results of clustering analysis indicated by matrix 604 may serve as an indication of the desirability of using the cutoff parameter with which the results of clustering analysis indicated by matrix 604 are generated, with the lowest score corresponding to the highest desirability.

Extrinsic clustering information may also be used in the general approach to cutoff parameter determination illustrated in FIG. 6. For example, with respect to the problem of gene expression clustering, it is often the case that the expression levels of a number of genes are known to be related by separate experiments or other extrinsic data. A representation of this a priori clustering information may be compared to the results of clustering analysis using different cutoff parameters, and scores generated for each cutoff parameter based on the discrepancies found between the a priori clustering information and the results of clustering analysis, analogously to the procedure for generating scores based on comparison of intrinsic information to clustering analysis results, described above. When a graph to be partitioned contains weighted edges, the sum of the weights of edges included in the a priori clustering information and absent after cluster analysis, and the sum of the weights of edges included during cluster analysis, but absent from the a priori clustering information, may be factored into the scores.

An alternative approach to determining cutoff parameters from intrinsic information is to compute inter-cluster and intra-cluster implied error rates from cluster analysis using various cutoff parameters, where, in the case of a graph having unweighted edges, the implied inter-cluster error is given by:

(number of input inter-cluster edges)/(number of potential inter-cluster edges) and the implied intra-cluster error is given by:

(number of input intra-cluster non-edges)/(number of potential intra-cluster edges)

The cutoff parameter providing the lowest combined implied inter-cluster and intra-cluster errors is then chosen as the best cutoff parameter. In the case of graphs having weighted edges, the sums of the weights of input edges, rather than their number, may be used in the above implied cluster error calculations. More detailed analysis of functions of implied error rates or scores with respect to cutoff parameters, or numerical approximations of such functions, may allow optimal cutoff parameters to be selected by well-known minimization or optimization techniques.

Although the present invention has been described in terms of a particular embodiment, it is not intended that the invention be limited to this embodiment. Modifications within the spirit of the invention will be apparent to those skilled in the art. For example, many different types of similarity metrics can be applied to data points to provide the similarities employed by various embodiments of the present invention in order to partition the data points into related subsets. Distance-based metrics may be used, as well as many other types of correlations. Embodiments of the present invention can be applied to perform cluster analysis on a wide variety of data, from data generated from scientific experiments to economic observations. The present invention may be implemented in many different ways, using many different computer languages, different class organizations and class structures, different control statements and code organizations, and different design choices. Running tabulations of average affinities of entities within clusters for clusters can be kept, for example, to avoid or decrease the overhead incurred in recomputing average affinities. The techniques used to evaluate the effectiveness of clustering produced at different cutoff values may depend on the nature of the data and the field in which the clustering analysis is being performed. Relatedness inputs other than similarity matrices may be used, including functions that return the similarity between data points or entities.

The ability of the above-described method may be constrained, when large data sets are clustered, by the size of the similarity matrix that must be prepared. In order to handle large data sets, a subset of the large data set can be first randomly selected, and a similarity matrix can be prepared for the subset. The subset data can then be clustered into an initial set of clusters by some clustering method, including the clustering technique described above. A profile may be computed for each initial cluster that represents the average value, such as average expression level when genes are being clustered. Each entity in the remaining data can then be assigned, based on the computed profiles, to the smallest initial cluster for which the entity has the highest affinity. Alternatively, the affinities of all entities in the remaining data can calculated for each of the initial clusters, and each entity in the remaining data can then be assigned to the smallest initial cluster for which the entity has the highest affinity, without first profiling or averaging the initial clusters.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

What is claimed is:

1. A method for partitioning entities into a set of clusters, the method comprising:
   repeatedly
      opening a new cluster;
      selecting an entity not assigned to a cluster and assigning the selected entity to a new cluster;
      iteratively selecting additional entities not assigned to a cluster, with high affinities toward entities currently assigned to the new cluster, and assigning the selected additional entities to the new cluster and removing from the new cluster entities assigned to the new cluster that no longer have high affinities toward entities currently assigned to the new cluster; and
      closing the new cluster and adding the closed new cluster to the set of of clusters;
   until no entities remain that are not assigned to a cluster.

2. The method of claim 1 wherein iteratively selecting additional entities and assigning the selected additional entities to the new cluster and removing from the new cluster entities assigned to the new cluster that no longer have high affinities toward entities currently assigned to the new cluster further includes:
   repeatedly
      attempting to select an additional entity not assigned to a cluster with high affinity for the entities assigned to the new cluster,
      when an additional entity is selected, adding the additional entity to the new cluster;
      when an additional entity is not selected,
         attempting to select an entity currently assigned to the new cluster that now has low affinity for the entities assigned to the new cluster;
         when an entity currently assigned to the new cluster that now has low affinity for the entities assigned to the new cluster a entity is selected,
            removing the entity from the new cluster;
   until no additional entity not assigned to a cluster with high affinity for the entities assigned to the new cluster can be selected and no entity currently assigned to the new cluster that has low affinity for the entities assigned to the new cluster can be selected.

3. The method of claim 1 wherein an entity has high affinity for the entities assigned to the new cluster when an aggregate affinity of the entity for the entities currently assigned to the new cluster is at least equal to a threshold value and wherein an entity has low affinity for the entities assigned to the new cluster when an aggregate affinity of the entity for the entities currently assigned to the new cluster is below a threshold value.

4. The method of claim 1 wherein an entity has high affinity for the entities assigned to the new cluster when an aggregate affinity of the entity for the entities currently assigned to the new cluster is greater than a threshold value and wherein an entity has low affinity for the entities assigned to the new cluster when an aggregate affinity of the entity for the entities currently assigned to the new cluster is at most equal to a threshold value.

5. The method of claim 4 where an aggregate affinity of an entity for the entities in the new cluster is an average of the affinities of the entity for each entity currently assigned to the new cluster.

6. The method of claim 4 wherein an aggregate affinity of an entity for the entities in the new cluster is a linear combination of the affinities of the entity for each entity currently assigned to the new cluster.

7. The method of claim 4 wherein a final threshold value is determined by repeatedly clustering the entities using different threshold values.

8. The method of claim 7 wherein a threshold value that produces the most desirable clustering of entities is selected as the final threshold value.

9. The method of claim 8 wherein desirability of clustering is proportional to a score calculated for the clustering, the score equal to the number of large clusters multiplied by the number of entities contained within the large clusters, where large clusters are clusters exceeding a threshold number of members.

10. The method of claim 8 wherein desirability of clustering is proportional to a score calculated for the clustering, the score calculated from differences between an expected clustering and clustering obtained using a threshold value.

11. The method of claim 10 wherein the expected clustering is obtained from pair-wise similarity values for pairs of entities.

12. The method of claim 10 wherein the expected clustering is obtained from extrinsic data, such as known relationships between entities.

13. The method of claim 8 wherein desirability of clustering is inversely proportional to a combination of an implied inter-cluster error and an implied intra-cluster error.

14. The method of claim 1 wherein the affinities for all possible pairs of entities are stored in a similarity matrix.

15. The method of claim 14 wherein each entity is a vector of gene expression measurements for a particular gene and wherein the affinity of a first vector to a second vector is one minus a normalized distance between the endpoints of the first vector and the second vector.

16. The method of claim 1 further including:
when all entities have been assigned to clusters,
for each donor cluster in time-of-creation order, starting from the first cluster of the set of clusters,
for each acceptor cluster in time-of-creation order, starting from the cluster in the set of clusters next created after the donor cluster;
identifying any entities in the donor cluster that have a higher affinity for the acceptor cluster than for the donor cluster and moving the identified entities from the donor cluster to the acceptor cluster.

17. The method of claim 16 further including:
iteratively
comparing the affinity of each entity to that entity's current cluster and to other clusters;
marking each entity having a higher affinity of a cluster other than the entity's current cluster for relocation; and
moving all marked clusters to the cluster for which they have highest affinity
until no entities have higher affinities for clusters other than their current clusters.

18. The method of claim 17 further including terminating iteration of the comparing, marking, and moving steps after a fixed number of iterations, even when a number of entities have higher affinities for clusters other than their current clusters.

19. A system for recognizing related subgroups of entities within sets of entities and clustering the related entities into clusters, each cluster containing entities related according to a similarity metric, the system comprising:
a computer that can execute programs, accept input from a user, and display output to a user;
a computer-readable, initial set of non-clustered entities;
a similarity metric component that provides, in computer-readable form, similarity values that relate each entity with the remaining entities in the initial set of non-clustered entities;
a similarity cutoff value that partitions possible similarity values into low-affinity similarity values and high-affinity similarity values; and
a cluster analysis program that is executed by the computer, that receives, as input, the initial set of non-clustered entities, the similarity metric component, and similarity cutoff value, and that partitions the initial set of non-clustered entities into clusters by iteratively creating successive clusters, during each iteration creating a new cluster and selecting non-clustered entities to associate with the new cluster, until no non-clustered entities remain.

20. The system of claim 19 wherein the cluster analysis program iteratively generates successive clusters, a single cluster generated during each outer-level iteration of the cluster analysis program.

21. The system of claim 20 wherein the cluster analysis program maintains a list of entities not assigned to a cluster and a list of clusters generated by the cluster analysis program.

22. The system of claim 20 wherein, during each outer-level iteration of the cluster analysis program, the cluster analysis program:
opens and initializes a new, current cluster; and
repeatedly
identifies a candidate entity not assigned to a cluster having an affinity for the current cluster at least as great as any other entity not assigned to a cluster;
when the affinity of the candidate entity is a high affinity, as determined by the cluster analysis program with reference to the similarity cutoff value, adding the candidate entity to the current cluster and removing the candidate entity from the list of entities not assigned to a cluster; and
when the affinity of the candidate entity is a low affinity,
when an alternate candidate entity contained within the current cluster having at least as low an affinity for the current cluster as any other entity contained within the current cluster has a low affinity for the current cluster, removing the alternate candidate entity from the current cluster and reassigning the alternate candidate entity to the list of entities not assigned to a cluster; and
when an alternate candidate entity contained within the current cluster having at least as low an affinity for the current cluster as any other entity contained within the current cluster has a high affinity for the current cluster, closing the current cluster;
until the current cluster is closed.

23. The system of claim 22 wherein, following assignment of all entities in the initial set of entities to clusters, entities from earlier-constructed clusters may be reassigned to later-constructed clusters for which the entities have a higher affinity.

24. Electronic signals embodied in a carrier wave that encode computer instructions that implement the cluster analysis program of claim 19.

25. A computer-readable medium containing computer instructions of the cluster analysis program of claim 19.

26. A computer-readable medium containing an indication of the clusters generated by the cluster analysis program of claim 19.

27. Electronic signals embodied in a carrier wave that encode an indication of the clusters generated by the cluster analysis program of claim 19.

* * * * *